3,154,540
PURIFICATION OF LACTAMS
Ludwig Beer, Horst Metzger, and Dieter Weiser, Ludwigshafen (Rhine), Germany, assignors to Badische Anilin- & Soda-Fabrik Aktiengesellschaft, Ludwigshafen (Rhine), Germany
No Drawing. Filed Aug. 1, 1963, Ser. No. 299,186
Claims priority, application Germany Aug. 4, 1962
12 Claims. (Cl. 260—239.3)

This invention relates to a new process for the purification of lactams which have been obtained by rearrangement of so-called photooximes.

It is known that very pure lactams are required for the production of high grade polyamides based on omega-aminocarboxylic acids. An amount of impurities which can scarcely be detected analytically is sufficient to cause considerable decrease in quality. Thus polyamides which have been prepared from impure lactams exhibit a tendency to become yellow and a broad molecular weight spectrum. Moreover impure lactams are themselves often insufficiently stable in storage.

A number of purification methods for lactams is known. For example lactams may be purified according to German patent specification No. 739,953 by distillation in the presence of a small amount of an alkaline or acid reacting additive. Purification of caprolactam by recrystallization from water is also already known. Treatment with ion exchange compounds has also already been recommended as a purification method. In French patent specification No. 904,162 the purification of lactams by the action of hydrogen in the presence of hydrogenation catalysts is described. Oxidative purification of lactams is also already known. Thus treatment of impure lactams with oxygen in the presence of oxidation catalysts has already been carried out. Purification of lactams by the action of alkali metal permanganates is the subject of Canadian patent specification No. 540,045. Another principle of purification is described in Swiss patent specification No. 326,165 according to which lactams are treated with stoichiometric amounts of metal halides, preferably zinc chloride, and the complex salts thus formed are decomposed to the free lactams. Furthermore it is known from German patent specification No. 850,746 that lactams contaminated by bases, particularly epsilon-caprolactam which has been recovered from polyamides by alkali cracking, can be purified by treating them with concentrated acid salt solutions, separating the lactam from the salt solution and distilling it.

The prior art purification methods are more or less expensive and lead to more or less pure products. It is common to them all that they do not give satisfactory results when used for purifying lactams which have been obtained by rearrangement of photooximes. Photooximation is the reaction of cyclic hydrocarbons with nitrosyl chloride or nitrogen monoxide and chlorine with exposure to light. This method, which has recently acquired increasing importance, is advantageously carried out in the presence of hydrogen chloride.

It is an object of this invention to provide a process by which lactams from so-called photooximes may be effectively purified.

In accordance with this invention it has been found that lactams which have been obtained by rearrangement of oximes or salts thereof which have been formed by reaction of saturated cycloaliphatic hydrocarbons with nitrosyl chloride or nitrogen monoxide and chlorine, if desired in the presence of hydrogen chloride, can be purified advantageously by bringing the lactam into contact with a catalytic amount of magnesium, aluminum, copper, zinc, a metal of the iron group of the periodic system of elements, or a chloride or carbonate of group IIA or IIB or aluminum chloride or an oxide of an element of group IIIA, IIB, the iron group or of copper and then distilling it. The references to groups relate to the periodic chart of the elements in which the transition elements are in the B groups while the remaining elements are in the A groups.

The process according to this invention yields lactams which satisfy present-day high requirements as to purity. The lactams give high-grade polyamides which do not become yellow, which have a relatively narrow molecular weight spectrum and which have outstanding stability in storage. It is evident that the process according to this invention removes impurities which are not present in lactams from other sources but which persistently remain in lactams obtained by rearrangement of photooximes and cannot be removed by the prior art purification methods.

Surprisingly the metal oxides and the metals specified above, particularly zinc, also inhibit polymerization of the lactams. For example if crude laurolactam which has been obtained by rearrangement of photooxime is heated to 220° C. while excluding air, the melt contains only 78% of monomeric lactam after nine hours. If however 1% of commercial amalgamated zinc powder be added, the proportion of monomer after nine hours under the said conditions is still 96%. By adding the said metals or metal oxides in the distillation, not only is the quality of the lactams improved but the yield is also increased.

Examples of suitable initial materials for the process are lactams having five to twelve carbon atoms and which, apart from the lactam grouping, have saturated hydrocarbon structure and have been obtained by photooximation of the corresponding hydrocarbons. Specific examples are piperidone-(2), caprolactam, oenanthlactam, capryllactam, omega-aminodecanoic acid lactam and laurolactam. The process has particular importance in the purification of lactams having nine to thirteen ring members. These have hitherto been particularly difficult to purify but may be directly brought to the necessary degree of purity by the new process.

Photooximation of cycloaliphatic hydrocarbons and rearrangement of oximes do not form part of the present invention, both of these reactions being carried out by conventional methods. Nitrosyl chloride, or nitrogen monoxide and chlorine, may be allowed to act at −30° to +40° C. on the cycloaliphatic hydrocarbon, the mixture being irradiated with rays having a wavelength preferably between 350 and 450 millimicrons. Mercury vapor lamps are suitable sources of such rays. Photooximation is advantageously carried out while adding hydrogen chloride.

The oxime is obtained in the form of its hydrochloride and may be rearranged as such, advantageously in 80 to 100% sulfuric acid or in oleum having sulfur trioxide contents of up to 10% by weight by heating at 80° to 150° C. Naturally it is also possible to liberate the oxime from its hydrochloride by the action of a base or, in the case of cyclododecanone oxime, of water and then to carry out the rearrangement, either in sulfuric acid or in phosphoric acid or in contact with a solid catalyst. Another possibility consists in extracting the oxime hydrochloride direct from the reaction solution by using strong mineral acids, e.g., concentrated sulfuric acid, solutions of the oxime or mineral acid salt, e.g., sulfate, in the mineral acid being formed with the liberation of hydrogen chloride. The mineral acid solutions may then be rearranged into the corresponding lactams by heating to 80° to 150° C.

The initial material in the process according to this invention may be molten, dissolved in an inert solvent, or vaporous, molten lactams being preferred. Examples of suitable inert solvents are aliphatic, cycloaliphatic and aromatic hydrocarbons. Lower aliphatic alcohols may however also be used.

The substances with which the lactams are to brought into contact are metals, metal salts or metal oxides. The metals are preferably used as so-called Raney metals, as powder or in the form of granules or chips. They may be activated by conventional methods, zinc and aluminum for example by treatment with iodine or mercury salts. Zinc is a very effective metal, particularly when it is used as the commercial product and/or is activated by a mercury salt. A very effective combination of metals is zinc and a Raney metal of the iron group, particularly Raney nickel.

The chlorides of zinc, calcium and aluminum are the preferred metal salts. Zinc carbonate and magnesium carbonate are also suitable. Suitable oxides are particularly those of aluminum, zinc, iron, cobalt and nickel.

The metals, metal salts or metal oxides are in general used in amounts of 0.01 to 10% by weight with reference to the lactam to be purified. The optimum amount depends on the degree of purity of the lactam and differs somewhat according to the lactam and the metal, metal salt or metal compound. It is best ascertained by a preliminary test. Larger amounts of metal, metal salt or metal oxide do not as a rule cause any damage but neither do they bring any particular advantage.

The duration of the treatment is usually between half an hour and twenty hours. In the case of metals and metal oxides, the duration of the purification is not critical because these substances inhibit polymerization. When using metal salts, particularly zinc chloride and aluminum chloride, the optimum duration should not be exceeded because otherwise appreciable polymerization of the lactam may take place. In such cases, however, polymerization may be inhibited by adding suitable stabilizers, such as 2,4,6-tri-tertiary-butylphenol.

The process according to the invention is advantageously carried out at between room temperature and about 250° C. Preferred temperatures are between 70° and 250° C. When a solvent is co-employed, temperatures above 100° C. are recommendable. When using metal chlorides the lowest possible temperature is chosen because of the risk of polymerization, whereas metal oxides require the highest temperatures.

It is advantageous to work under an atmosphere of a gas which is inert to the lactam, for example under a nitrogen or hydrogen atmosphere. The use of hydrogen is particularly recommendable when working with zinc and a Raney metal of the iron group as described above. Air may also be regarded as an inert gas provided the temperature does not exceed about 150° C. It is usual to work at atmospheric pressure but it is also possible to use superatmospheric or subatmospheric pressure.

The process may for example be carried out by heating the lactam and the metal, metal salt or metal oxide for some time at the desired temperature. The metal, metal salt or metal oxide is advantageously finely dispersed in the liquid phase, for example by an effective stirrer. The treatment mixture may be distilled continuously or batchwise without separating the solid constituents. It is also possible however to separate the metal, metal salt or metal oxide by filtration or centrifuging prior to the distillation of the lactam solution or melt. Purification of the lactams may also be combined with their distillation for example by continuously introducing the metal, metal salt or metal oxide into the distillation apparatus and ensuring adequate contact between the lactam and the said substances. It is also possible to pass the lactam in vapor phase, if desired diluted with inert gases, over the metal, metal salt or metal oxide which may be supported on a carrier.

The following examples will further illustrate this invention. The parts specified in the examples are by weight.

*Example 1*

Laurolactam is to be purified which has been obtained by rearrangement of cyclododecanone oxime (obtained according to Example 1 of German patent specification No. 1,079,036) in the way described in Example 1 of German patent specification No. 1,094,263. 200 parts of molten crude laurolactam is heated under a nitrogen atmosphere with 2 parts of commercial zinc dust (which has been treated previously with 65 parts of a 1% solution of mercuric chloride in water for thirty minutes and then washed with water and dried) to 160° to 180° C. while stirring. The treatment mixture is then distilled and, after a first runnings of about 10 parts, mainly consisting of laurolactam, a main fraction is obtained consisting of 180 parts which has the boiling point 193° to 195° C. at 10 mm. Hg. The yield is 95% with reference to the crude lactam. During the distillation, the temperature in the still containing the zinc dust was 235° C.

A sample of the main fraction (boiling point 152° C.) is fused with 3% by weight of hexamethylene diammonium adipate under nitrogen in a pressure resistant glass tube and heated at 270° to 280° C. for twenty hours. The laurolactam is thus polymerized. The polymer color number of the polylactam melt is 60 according to the Hazen scale.

Determination of the polymer color number by the Hazen scale is effected by comparing the polylactam melt with standard solutions which have been obtained by dissolving a definite amount of potassium hexachloroplatinate (IV) and cobaltous chloride in aqueous hydrochloric acid. Low color numbers, for example 60 or 80, are to be regarded as good and high color numbers, for example 200, as bad.

By following the above procedure but without the co-employment of amalgamated zinc dust, a lactam having the polymer color number 250 to 300 is obtained in a poor yield.

In an analogous way and using other metals or metal salts or metal oxides, the results given in the following table are obtained, 100 parts of laurolactam being treated in each case:

| Parts of additive | Polymer color number |
| --- | --- |
| 1, nickelous oxide | 110 |
| 2, ferrous oxide | 90 |
| 1, CuO | 120 |
| 2, calcium oxide | 80 |
| 1, zinc chloride | 60 |
| 1, magnesium (activated with iodine) | 80 |
| 1, pure zinc dust | 60 to 80 |
| 1, commercial zinc dust | 60 to 80 |
| 0.1, commercial zinc dust (activated with mercury) | 80 |
| 10, commercial zinc dust | 60 |
| 2, aluminum powder (activated with mercury) | 100 |
| 2, copper powder (activated with iodine) | 80 |
| 1, Raney nickel | 100 |
| 2, iron powder | 100 |
| 1, zinc oxide | 80 |
| 0.5, calcium carbonate | 100 |
| 1, MgCO$_3$ | 100 |
| 2, BaCl$_2$ | 120 |
| 0.5, AlCl$_3$ | 80 |
| 2, Al$_2$O$_3$ | 100 |

*Example 2*

100 parts of the laurolactam described in Example 1 is purified under the conditions described in Example 1 with various purifying agents, but working under an atmosphere of hydrogen and at atmospheric pressure. The following results are obtained:

| Parts of additive | Polymer color number |
| --- | --- |
| 1, Raney nickel | 80 |
| 2, Raney nickel + 1 zinc dust (activated with mercury) | 40 |
| 0.5, Raney cobalt + 0.5 zinc dust | 60 |
| 0.2, Raney nickel + 0.2 zinc dust | 60 |

*Example 3*

250 parts of crude laurolactam (obtained as in Example 1) is mixed with 2 parts of amalgamated zinc dust in a still and then distilled once at 10 mm. Hg. The polymer color number of the distillate is 60 to 80.

If distillation of the lactam is repeated with a fresh addition of amalgamated zinc dust, the polymer color number is 40.

When distillation is carried out without addition of amalgamated zinc dust, the polymer color number after the first distillation is 250 to 300 and after the second distillation it is 150.

*Example 4*

200 parts of crude caprolactam (obtained by continuous photooximation according to Example 1 of U.S. patent specification No. 2,879,215 and rearrangement of the cyclohexanone oxime hydrochloride according to Example 4 of U.S. patent specification No. 2,883,377 is placed in a still and 10 parts of amalgamated zinc dust is added thereto; the whole is heated under reflux for two hours and then distilled under subatmospheric pressure. After 10 parts of first runnings, 175 parts of caprolactam passes over with a boiling point of 138° to 140° C. at 12 mm. Hg. The product has a polymer color number of 60.

If the lactam is distilled without adding zinc dust, a color number of 350 is obtained.

Purification in an analogous way may also be used for capryllactam which has been prepared from cyclooctane by reaction with nitrosyl chloride and rearrangement of the resultant cyclooctanone oxime hydrochloride with sulfuric acid. Polymer color numbers of 60 (when amalgamated zinc dust is coemployed) and 350 (when working without addition of a purifying agent) are obtained.

*Example 5*

5 parts of Raney nickel is added to a solution of 100 parts of crude laurolactam (see Example 1) in 150 parts of methanol and the mixture is stirred for one hour at room temperature. The Raney nickel is filtered off, the solvent evaporated and the residue distilled under subatmospheric pressure. After a first running of 5 parts, mainly consisting of lactam, 89 parts of a main fraction having a boiling point of 193° to 195° C. is obtained which has a melting point of 152° C. The yield of pure laurolactam is 94%. The product has a polymer color number of 150.

If the treatment of laurolactam is carried out under the same conditions at refluxing temperature, the polymer color number is 100. By heating the mixture in an autoclave to 180° C., a laurolactam is obtained which has a polymer color number of 80.

*Example 6*

200 parts of crude capric lactam (prepared continuously by the action of nitrosyl chloride on cyclodecane in the presence of hydrogen chloride with exposure to light and by rearrangement of the cyclododecanone oxime with sulfuric acid) is mixed in the usual way with 2 parts of amalgamated zinc dust in a still, heated under reflux with a still temperature of 200° C. for one hour under subatmospheric pressure, and then distilled. After a first runnings of 5 parts has been withdrawn, the remaining main fraction, having a boiling point of 190° C. at 12 mm. Hg, has a polymer color number of 60.

If the lactam is distilled without adding zinc dust, a product is obtained having a color number of 300.

We claim:

1. A process for the purification of lactams which have been obtained by rearrangement of substances selected from the group consisting of cycloaliphatic oximes and their salts, said substances having been prepared by reaction of the corresponding saturated cycloaliphatic hydrocarbons with an agent selected from the group consisting of nitrosyl chloride on the one hand and mixtures of nitrogen monoxide and chlorine on the other hand, which comprises bringing a lactam of the said type into contact with a substance selected from the group consisting of magnesium, aluminum, copper, zinc, the metals of the iron group of the periodic system, chlorides of metals of group IIA, of aluminum and of group IIB of the periodic system, carbonates of group IIA and group IIB of the periodic system, and oxides of elements of group IIIA, group IIB, the iron group of the periodic system and of copper, and distilling the lactam.

2. A process as claimed in claim 1 wherein the temperature is between 0° and 250° C.

3. A process as claimed in claim 1 wherein the temperature is between 70° and 250° C.

4. A process as claimed in claim 1 wherein an inert solvent is used.

5. A process as claimed in claim 1 carried out under the atmosphere of a gas which is inert to the lactam under the conditions of the process.

6. A process as claimed in claim 1 wherein a lactam having nine to thirteen ring members is purified.

7. A process as claimed in claim 1 wherein the lactam is capryllactam.

8. A process as claimed in claim 1 wherein the lactam is laurolactam.

9. A process as claimed in claim 1 wherein the lactam is brought into contact with zinc.

10. A process as claimed in claim 1 wherein the lactam is brought into contact with zinc and a Raney metal of the iron group.

11. A process as claimed in claim 1 wherein the lactam is brought into contact with zinc and Raney nickel.

12. A process as claimed in claim 1 wherein the lactam is brought into contact with amalgamated zinc dust.

No references cited.